July 3, 1928.
C. RORABECK
1,676,053
CONVEYER CHAIN LINK
Filed Oct. 27, 1924
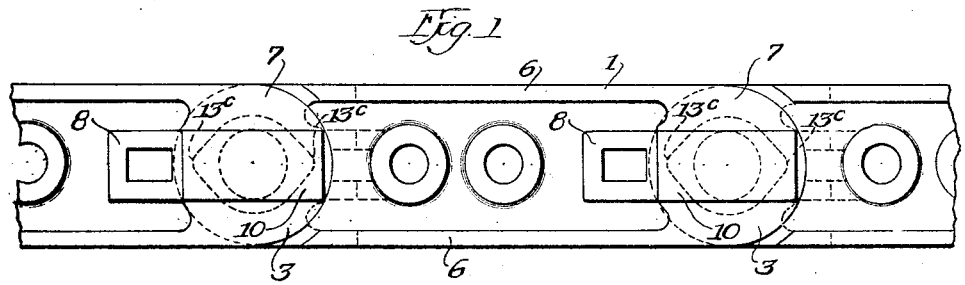
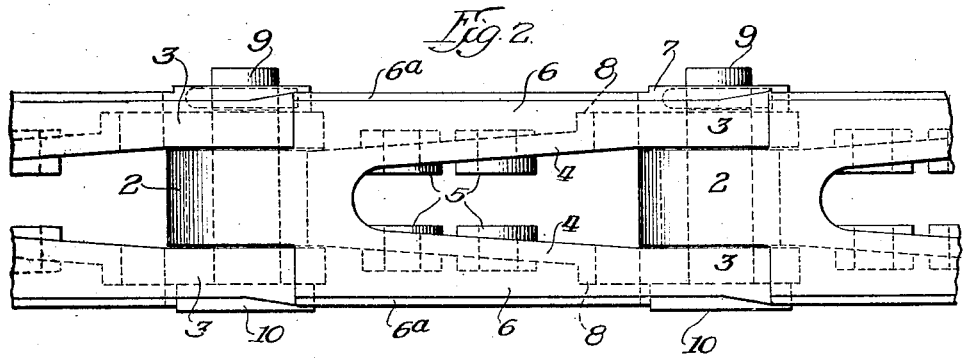
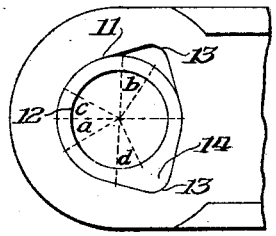 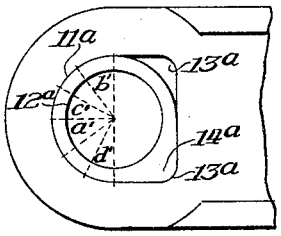 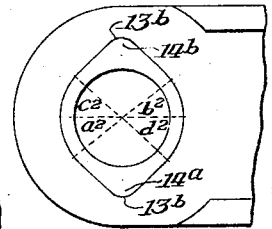
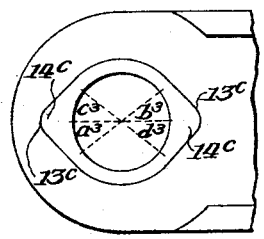 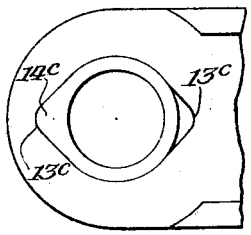 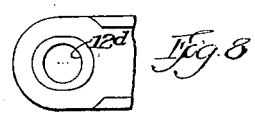
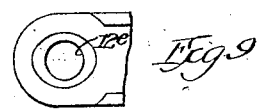
Inventor:
Claude Rorabeck,
By Wilkinson, Hudley, Bynow & Knight
Attys
Witness:
Geo. C. Larson Patented July 3, 1928.

1,676,053

UNITED STATES PATENT OFFICE.

CLAUDE RORABECK, OF CHICAGO HEIGHTS, ILLINOIS, ASSIGNOR TO AMERICAN MANGANESE STEEL COMPANY, OF CHICAGO, ILLINOIS, A CORPORATION OF MAINE.

CONVEYER-CHAIN LINK.

Application filed October 27, 1924. Serial No. 745,987.

This invention relates to the construction of an endless chain made up of links articulated through means of pintles passing through the lapped ends of adjacent links, and particularly to the construction of the bearings provided for the pintles in the links. The invention has for its object to provide a novel construction of shiftable bushing used in pintle openings of the kind described for the purpose of rendering the pintle bearing more durable and bringing new bearing surfaces into positions of greater wear, and thus prolong the duration of use of the bushing.

The invention proceeds upon the principle of not only fitting a bushing in a joint member in a manner to permit it to assume and maintain a plurality of positions to which it may be selectively adjusted, but to have the positioning means of such nature that it can be more readily and economically produced in articles made of manganese steel or other material, which because of its nature can be finished only by grinding; also to have the positioning means of such nature that it develops an excess of metal at the places of wear, and thus leaves the bushing in a sufficiently strong condition even after wear has taken place. In order to render more durable the pintle openings at the ends of the links, through means of which they are articulated with the ends of adjacent links, said openings are provided with bushings, and these bushings and openings are so designed that while a bushing is normally held against rotation in its link, it may be shifted into any of a plurality of different positions which will bring different sectors of the inner surface of the bushing into the position of greatest wear in the hinging action of the link; this part of the invention being preferably realized by designing the pintle openings of the links and the external surfaces of the bushings with characteristic sections providing meeting surfaces that are mainly circular, but interrupted by a salient or salients in the external curvature of the bushing and correspondingly curved recesses in the pintle opening at circumferentially spaced points adapted to receive the salients; and these characteristic sections continue throughout the length of the bushings and pintle openings.

In order that the invention may be fully understood, the preferred construction of the links and several embodiments of shiftable bushings are shown in the accompanying drawings, in which—

Figure 1 is a side elevation of one complete link and portions of two adjacent links; and Figure 2 is a plan view of the same.

Figures 3 to 9, inclusive, represent in side elevation seven different designs of pintle opening and bushings adapted thereto, all of which embody the principles of one part of the present invention.

Referring to Figures 1 and 2, 1 represents a conveyer chain link which is constructed with a single knuckle member 2 at one end and spaced knuckle members 3 at the other end, said knuckle members being united through means of a pair of webs 4 that diverge from the single member 2 toward the spaced members 3, and which webs may be provided with bearing members 5 for a conveyer bucket or other implement to be hung upon the chain. In order to prolong the life of the link 1 and resist wear which it must encounter in passing around sprockets or over guide sheaves, the link is provided at the longitudinal margins of its webs 4 with flange-like rails 6 integral with said webs and extending from the single knuckle member 2 to the spaced knuckle members 3, with the hubs 7 of which said rails merge in a manner to lend a material increase of strength between the hubs and the webs. Rails 6 are duplicated at both top and bottom of the link 1, and, in fact, the various elements which make up the design of the link are symmetrically related to the upper and lower faces of the link, so that the link may be reversed in position and enter into all the functions for which it is intended as well in one position as in the other. The outer edges 6ᵃ of the rails 6 are preferably parallel to the longitudinal axis of the chain, and inasmuch as the webs 4 diverge from the single knuckle member 2 to the spaced knuckle members 3, the rails increase in depth from the spaced members rearward, and the strength of the link as a whole is correspondingly increased. The drop in thickness between the hubs 7 and the thinner portions of the webs 4 is preferably in stages, so as to leave an intermediate step or shoulder 8 in each web remote from the hub 7, which renders the structure stronger against transverse stresses than if the change were made abruptly from the hub to the web. The rear ends of the rails 6 merge tangentially with the single knuckle member 2, and this increases the strength of the link at its rear end.

9 represents pintles passing through the spaced knuckle members 3 of each link and the intervening single knuckle member 2 of an adjoining link, and these pintles are preferably constructed with rectangular heads 10 seated in recesses of the lugs in a known manner to prevent the pintles from turning in the spaced knuckle members in the flexing of the chain.

Referring to Figures 3 to 9, 11 (Figure 3) represents a pintle opening, and 12 a bushing adapted to said opening through surfaces that are mainly cylindrical but interrupted by a pair of recesses 13 in the pintle opening, about 120° apart, and projection 14 constituting in effect a salient in the curvature of the bushing, which can be introduced into either of said recesses 13 in order to bring into the position of greatest wear, namely, where friction develops in the flexing of the chain around the guides, either the sector $a$ or the sector $b$, at will. The bushing 12 is uniform in section from end to end and therefore may likewise be changed in position by turning it end for end or rotating it upon its horizontal diameter, and thereby bringing still other surfaces into wearing position, for instance, the projection 14 being thereby changed from the lower to the upper recess 13, the sector $c$ would be substituted for the sector $a$, and then by shifting the bushing to bring the projection 14 back to the lower recess 13 while remaining in its reversed position, the sector $d$ will be brought into the wearing position.

In Figure 4, recesses $13^a$ in the pintle opening $11^a$ receive the projection $14^a$ of the bushing $12^a$ in all respects as in Figure 3, except that the recesses are but 90° apart, and the pairs of alternatively available wearing sectors $a'$, $b'$, $c'$, and $d'$ will be found in a smaller arc of the bushing than in Figure 3.

According to Figure 5, recesses $13^b$ are 180° apart on a vertical diameter, and corresponding projections $14^b$ are duplicated, since rotation of the bushing through the arc which lies between the two recesses will bring each projection into a recess. Here, the bushing may be turned end for end about either a vertical or a horizontal diameter and, as in Figures 3 and 4, four different sectors of the bushing, $a^2$, $b^2$, $c^2$, and $d^2$ can be presented at the point of greatest wear.

Figure 6 corresponds substantially to Figure 5, except that the recesses $13^c$ receiving projections $14^c$ are 180° apart on a horizontal diameter, and the sectors $a^3$, $b^3$, which are successively presented in wearing position by rotation of the bushing before reversal of its ends, and the sectors $c^3$ and $d^3$, that may similarly be brought to wearing position after reversal of the ends of the bushing, are symmetrically disposed on opposite sides of a diameter extending through the projections.

Figure 7 corresponds to Figure 6 with respect to the recesses $13^c$, but employs but a single projection $14^c$.

As suggested in Figures 8 and 9, the results obtainable with the construction of the antecedent figures generally, and of Figures 5 to 7 specifically, can be equally well obtained by giving to the pintle openings and bushings, oval, elliptical oblate, or other designs, developing in them major and minor transverse axes that will admit of their assembly at different relative angles of revolution and in longitudinally reversed positions.

It is to be understood that in all of the several forms of shiftable but non-rotatable bushing, the dimensions of both the pintle openings and the bushings in the direction of their longitudinal axes is uniform, so that they enter into assembly with the bushing presented either end foremost.

It will also be observed that the projections or salients on the bushings and the recesses in the pintle openings that receive the bushings are made up mainly of curved lines or surfaces readily finished by grinders, which is an important feature inasmuch as the best material for producing these bushings is manganese steel, which can best be worked by foundry practice involving finishing by grinding.

I claim:

1. In conveyer chains, links having pintle connections at their ends; said links being constructed with pintle openings having bushings to receive the pintles; said bushings being constructed with characteristic sections extending throughout their lengths providing external surfaces of approximately continuous arcuate form but developed with curved salients; and the link openings having a characteristic section which provides a plurality of re-entrant portions corresponding to the curvature of the salients on the bushings, whereby the bushings may be fixed in different positions in the links.

2. In conveyer chains, links having pintle connections at their ends; said links being constructed with pintle openings having bushings to receive the pintles; said bushings being constructed with characteristic sections extending throughout their lengths providing external surfaces of approximately continuous arcuate form but developed with curved salients; the link openings having a characteristic section which provides a plurality of re-entrant portions corresponding to the curvature of the salients on the bushings, whereby the bushings may be fixed in different positions in the links; and the salients on the bushings being adjacent the points of greater wear on the bushing and thereby providing metal to maintain the integrity of the bushing after it is worn.

3. In conveyer chains, links having pintle connections at their ends; said links being constructed with pintle openings having bushings to receive the pintles; said bushings being constructed with characteristic sections extending throughout their lengths providing external surfaces of approximately continuous arcuate form but developed with curved salients; and the link openings having a characteristic section which provides a plurality of re-entrant portions corresponding to the curvature of the salients on the bushings, whereby the bushings may be fixed in different positions in the links; there being a plurality of salients on each bushing, and these salients being located adjacent the circumferential points on the bushings opposite the points of greater wear within the bushings, whereby the integrity of the bushing is insured when worn.

Signed at Chicago Heights, Illinois, this 13th day of October, 1924.

CLAUDE RORABECK.